United States Patent [19]

Holly

[11] 3,707,898
[45] Jan. 2, 1973

[54] FASTENER
[75] Inventor: James A. Holly, Richton Park, Ill.
[73] Assignee: Hollymatic Corporation
[22] Filed: Sept. 8, 1971
[21] Appl. No.: 178,646

[52] U.S. Cl. .................................................85/3 R
[51] Int. Cl. ...........................................F16b 37/04
[58] Field of Search .............85/3 R, 3 S, 3 K; 151/43

[56] References Cited

UNITED STATES PATENTS

| | | | |
|---|---|---|---|
| 2,609,723 | 9/1952 | Stubbs | 85/3 K |
| 2,908,196 | 10/1959 | Apfelzweig | 85/3 R |
| 3,127,807 | 4/1964 | Modrey | 85/3 R |
| 3,248,994 | 5/1966 | Mortensen | 85/3 R |

FOREIGN PATENTS OR APPLICATIONS

| | | | |
|---|---|---|---|
| 1,152,070 | 5/1969 | Great Britain | 85/3 R |

*Primary Examiner*—Marion Parsons, Jr.
*Attorney*—Axel A. Hofgren et al.

[57] ABSTRACT

A fastener attachable to an article having a fastener receiving opening with spaced first and second areas such as inner and outer surface areas in which the fastener has a first part with a laterally movable grasping portion adapted to be arranged against the first area, a second part carrying the first part with the grasping portion retracted for insertion of the fastener into the receiving opening in which the second part has a grasping portion adapted to be arranged against the second area, means for moving the first part grasping portion laterally relative to the second part after insertion of the fastener into the opening to project the first part grasping portion laterally of the second part preparatory to subsequent engagement with the first area, and means such as a threaded screw engaging a threaded opening in the first part for moving the projecting first part and the second part relatively toward each other to press the grasping portions against the first and second areas of the article and fix the fastener in position in the fastener receiving opening.

16 Claims, 5 Drawing Figures

PATENTED JAN 2 1973  3,707,898
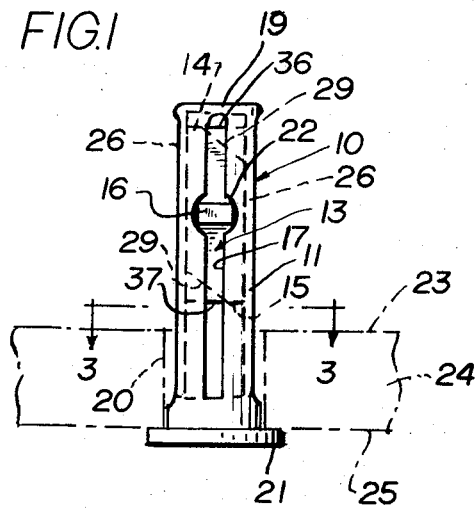
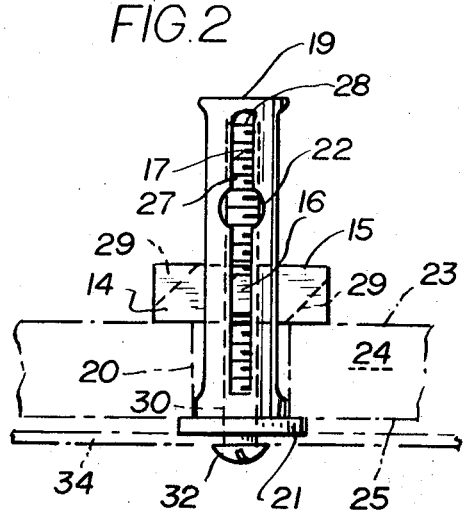
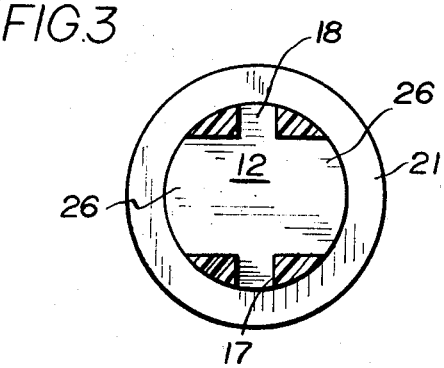
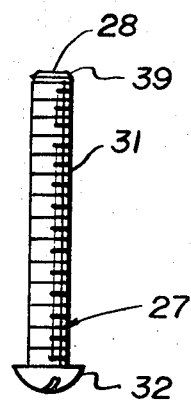
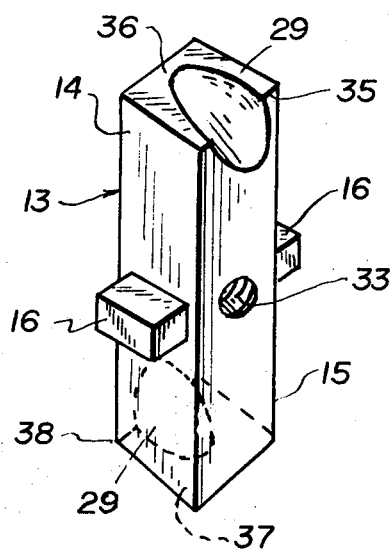

FASTENER

BACKGROUND OF THE INVENTION

The most pertinent prior art of which applicant is aware are the following U.S. Pat. Nos. 2,609,723, 2,908,196, 3,127,807 and 3,248,994. However, as can be seen from the description of the invention given herein and the claims the present invention has many important features and advantages that are not disclosed in any of these references or any other reference of which applicant is aware.

One of the features of this invention is to provide a compact fastener in two inseparable but relatively movable parts that may be of small cross sectional area and that is insertable into a fastener receiving opening in an article having spaced apart first and second areas and means for moving one part relative to the other and drawing the parts together after insertion into the opening so that the two parts firmly and securely engage the spaced areas to fix the fastener in the opening.

Other features and advantages of the invention will be apparent from the following description of one embodiment thereof.

BRIEF DESCRIPTION OF THE DRAWINGS

FIG. 1 is a side elevational view of a fastener embodying the invention with an article such as a wallboard indicated in broken lines in proper relationship to the fastener.

FIG. 2 is a view similar to FIG. 1 but turned at right angles and with the fastener parts in article grasping position.

FIG. 3 is an enlarged sectional view taken substantially along line 3—3 of FIG. 1.

FIG. 4 is a side elevational view of a threaded screw forming a part of the fastener.

FIG. 5 is an enlarged perspective view illustrating a first part of the fastener.

DESCRIPTION OF THE PREFERRED EMBODIMENT

In the illustrated embodiment the fastener 10 comprises a generally cylindrical plastic part 11 having a longitudinal interior or bore 12 in which is located an elongated plastic part 13 having opposite ends 14 and 15 substantially completely within the confines of the plastic part 11 prior to insertion of the fastener into a fastener receiving opening 20 as illustrated in FIG. 1.

The part 13 is an elongated first part and is provided with pivot means 16 in the form of projecting and transversely aligned bosses shown as rectangular in this embodiment that are located about midway between the extreme opposite ends of the part 13.

The pivot means or bosses 16 are located in opposite and parallel guideways 17 and 18 in the form of elongated slots in the second part 11. These slots are closed on their opposite ends by the closed inner end 19 of the second part 11 that is inserted into the fastener receiving opening 20 and a head end 21 on the opposite or outer end of the fastener.

When the first part 13 of the fastener is arranged adjacent the closed inner end 19 of the second part 11 as shown in FIG. 1 the opposite bosses 16 on the first part 13 are positioned in rounded enlargements 22 forming parts of the guideway slots 17 and 18. Forwardly of these enlargements 22 the bosses 16 which are of quadrangular cross sectional shape are snugly received within the parallel sides of the slots 17 and 18 after the part has been rotated 90° as shown in FIG. 2.

The ends 14 and 15 of the first plastic part 13 on opposite sides of the bosses 16 comprise grasping portions adapted to be arranged against a first area 23 of the article 24 having the fastener receiving opening 20 while the enlarged head 21 on the fastener second part 11 comprises the grasping portion adapted to be arranged against the second area 25 on the outer surface of the article 24 when the fastener is in fastening position as illustrated in FIG. 2.

In order to provide for the lateral pivoting of the first part 13 of the fastener there are provided oppositely located openings 26 in the form of elongated parallel slots in the tubular second part 11 with these slots being aligned at right angles to the alignment of the first set of slots 17 and 18 as illustrated in FIG. 3.

The end 15 of the first part 13 that is adjacent the head end 21 of the second part 11 is provided with means engageable by a screw 27 or similar pivoting means to turn the first part 13 relative to the second part 11 while the bosses 16 are in the rounded enlargements 22 as shown in FIG. 1. In the illustrated embodiment this pivot means or screw 27 is a conventional screw with a blunt end 28 that is adapted to engage an angled arcuate groove 29 in either end 14 or 15 when the end 28 of the screw is inserted through an axial opening 30. In the illustrated embodiment the groove 29 intersects an edge 35 in one end surface 36 while the opposite end surface 37 has a similar groove 29 at the diagonally opposite edge 38. Each groove 29 is arranged at about 45° to its end surface 36 or 37.

The side 31 of the screw 27 between the end 28 and the head 32 is threaded with the customary screw thread. The first part 13 which operates as a cross piece contains a similarly threaded opening 33 at about its midpoint and between the bosses 16 and aligned at substantially right angles to the alignment of the bosses.

The operation of the fastener is as follows. When the article 24, which may be either a single thickness of material as shown or may be two or more thicknesses in superposed relationship, contains the fastener receiving opening 20 with the opposite first and second spaced areas 23 and 25 the fastener with the first part 13 turned as shown in FIG. 1 so as to be substantially completely contained within the interior 12 of the second part is then inserted into the article opening 20 as shown in FIG. 1. The screw 27 is then inserted through the entrance opening 30 from the exterior of the article 24 and pushed inwardly until the edge 39 of the end 28 engages the adjacent tangled groove 29 in the adjacent end 36 or 37 of the first part 13.

Further inward movement of the screw 27 thereupon pivots the first part 13 with the bosses 16 in the enlargements 22 to a right angled position relative to the fastener part 11 where the thin dimensions of the bosses 16 are aligned with the side guide slots 17 and 18.

After the part 13 has thus been turned to its right angled position (which is automatically accomplished by inward movement of the screw 27) the threaded opening 33 adapted to receive the screw is automatically aligned with the end 28 of the screw. Rotation of the screw thereupon screws it into the threaded opening 33 in the customary manner so that the first part or cross piece 13 functions as a nut on the screw 27. The screw can then be turned in the customary manner to draw the now right angularly arranged fastener part 13 against the inner area 23 and to draw the screw head 32 against the piece 34 that is being fastened on the article 24 as illustrated in FIG. 2.

From the above description it can be seen that the first part 13 of the fastener has laterally movable grasping portions comprising the two ends 14 and 15 adapted to be arranged against the first area 23 of the article 24. The second part 11 of the fastener which carries the first part 13 with the grasping portion retracted has a grasping portion embodied in the head end 21 for arranging against the second area 25 of the article. The screw 27 therefore and the parts of the fastener part 13 associated therewith comprise means for moving the first part or cross piece 13 laterally to the position shown in FIG. 2 where the ends 14 and 15 project outwardly of the fastener part 11. The screw together with the threaded opening 33 also comprise means for moving the projecting first part 13 of the fastener and the second part 11 relatively longitudinally of each other or toward each other to press the grasping portions against the first and second areas of the article.

Because the fastener parts 11 and 13 are connected for relative movement by the bosses 16 and slots 17 and 18, the fastener can be handled, inserted, the part 13 turned, and the screw 27 even withdrawn completely without the two parts 11 and 13 ever becoming completely separated. Furthermore, these slots 17 and 18 guide the relative movement of the two parts by confining the bosses 16 during this movement. Similarly because the bosses 16 are of quadrangular cross section snugly received within the slots 17 and 18 the fastener parts 13 may be held against rocking movement of any substantial degree except that necessary for alignment of the screw end 28 with the threaded opening after the bosses are out of the round enlargements 22.

One of the advantages of this invention is that the fastener is very inexpensive as it can be made of plastic parts. Furthermore, the two parts 11 and 13 of the fastener provide a positive clamping action when assembled with the screw 27 as illustrated in FIG. 2. Another very important advantage of the invention is that the single screw 27 upon insertion accomplishes two actions automatically. The screw first turns the fastener part or cross piece 13 to the right angular or clamping position illustrated in FIG. 2 and, second, automatically aligns the threaded opening 33 with the end 28 of the screw so that rotation of the screw engages the opening and threads the cross piece 13 along the screw in the manner of an ordinary nut even though the cross piece 13 is completely hidden within the confines of the article 24.

A further and very important advantage of the fastener of this invention is that if for any reason it is necessary to remove the screw 27 such as for removal of the attached piece 34 the cross piece 13 is still retained in its position relative to the part 11 even though not engaged by the screw 27 and upon reinsertion and turning of the screw 27 is again threaded as a nut on the screw. In many prior fasteners as soon as the screw is removed the interior fastener piece drops off.

Having described my invention as related to the embodiment shown in the accompanying drawings, it is my intention that the invention be not limited by any of the details of description, unless otherwise specified, but rather be construed broadly within its spirit and scope as set out in the appended claims.

I claim:

1. A fastener attachable to an article having first and second spaced areas and a fastener receiving opening therebetween into which said fastener is insertable for engagement with said areas of said article, said fastener comprising: an elongated first part; a hollow sleeve second part in which said first part is held for insertion of the fastener into said opening with the first part thereupon being located beyond said first area, said sleeve having a grasping portion adapted to engage said second area; a pair of pivot bosses extending from opposite sides of said first part intermediate the ends thereof, each boss having a length in a direction transverse to said first part that is considerably greater than its width, each of said bosses being located in a generally circular pivot follower means in said sleeve for pivoting said first part to a position transverse to said second part and said sleeve having oppositely located elongated openings through which said ends of the first part move during said pivoting; elongated parallel guideway means on opposite sides of said sleeve extending from adjacent said grasping portion and intersecting said pivot follower means, each said guideway means being of a width for receiving the widths of said bosses upon said pivoting; pivoting means for pivoting said first part to said transverse position in said pivot follower means; and moving means insertable in said sleeve from the end adjacent its said grasping portion for engaging said first part in its said transverse position and moving it toward the said grasping portion of the sleeve to grasp said article therebetween at said spaced areas.

2. The fastener of claim 1 wherein said moving means comprises a screw and said first part has a threaded opening engaged by said screw.

3. The fastener of claim 1 wherein said moving means comprises a screw, said first part has a threaded opening engaged by said screw, and said screw comprises said pivoting means.

4. The fastener of claim 1 wherein said sleeve is provided with a circularly continuous inner end that is opposite said grasping portion, said guideway means terminating adjacent to said inner end.

5. The fastener of claim 4 wherein the centers of said follower means are located a distance from said inner end that is slightly greater than the distance between an end of said first part and the center of said bosses to permit said transverse pivoting.

6. The fastener of claim 1 wherein each said boss is substantially rectangular with edges movable adjacent said circular pivot means during said pivoting.

7. The fastener of claim 1 wherein each said boss has its said length at least approximately twice its said width for stability during said pivoting, during said moving of said first part, and during said grasping of said article.

8. The fastener of claim 1 wherein each said circular pivot means has its center aligned with the longitudinal center of its corresponding guideway.

9. A fastener attachable to an article having first and second spaced areas and a fastener receiving opening therebetween into which said fastener is insertable for engagement with said areas of said article, said fastener comprising: an elongated first part; a hollow sleeve second part in which said first part is held for insertion of the fastener into said opening with the first part thereupon being located beyond said first area, said sleeve having a grasping portion adapted to engage said second area; a pair of pivot bosses extending from opposite sides of said first part intermediate the ends thereof, each boss having a length in a direction transverse to said first part that is considerably greater than its width, each of said bosses being located in a generally circular pivot follower means in said sleeve for pivoting said first part to a position transverse to said second part and said sleeve having oppositely located elongated openings through which said ends of the first part move during said pivoting, each said boss having its said length at least approximately twice its said width for stability during said pivoting and said moving of said first part; elongated parallel guideway means on opposite sides of said sleeve extending from adjacent said grasping portion and intersecting said pivot follower means, each said guideway means being of a width for receiving the widths of said bosses upon said pivoting, said sleeve being provided with a circularly continuous inner end that is opposite said grasping portion, said guideway means terminating short of said inner end, the centers of said follower means being located a distance from said inner end that is slightly less than the distance between an end of said first part and the center of said bosses to permit said transverse pivoting; pivoting means for pivoting said first part to said transverse position in said pivot follower means; and moving means insertable in said sleeve from the end adjacent its said grasping portion for engaging said first part in its said transverse position and moving it toward the said grasping portion of the sleeve to grasp said article therebetween at said spaced areas, each said circular pivot means having its center aligned with the longitudinal center of its corresponding guideway.

10. The fastener of claim 9 wherein each said boss is substantially rectangular with edges movable adjacent said circular pivot means during said pivoting 11. A fastener attachable to an article having first and second spaced areas and a fastener receiving opening therebetween into which said fastener is insertable for engagement with said areas of said article, said fastener comprising: an elongated first part having end surfaces; a hollow sleeve second part in which said first part is held for insertion of the fastener into said opening with the first part thereupon being located beyond said first area, said sleeve having a grasping portion adapted to engage said second area; a pair of pivot bosses extending from opposite sides of said first part intermediate the ends thereof, each boss having a length in a direction transverse to said first part that is considerably greater than its width, each of said bosses being located in a generally circular pivot follower means in said sleeve for pivoting said first part to a position transverse to said second part and said sleeve having oppositely located elongated openings through which said ends of the first part move during said pivoting; elongated parallel guideway means on opposite sides of said sleeve extending from adjacent said grasping portion and intersecting said pivot follower means, each said guideway means being of a width for receiving the widths of said bosses upon said pivoting; pivoting means for pivoting said first part to said transverse position in said pivot follower means comprising an inclined cam surface means at a said end surface of said first part having an end of the cam surface within the boundary of said end surface; and moving means insertable in said sleeve from the end adjacent its said grasping portion for engaging said first part in its said transverse position and moving it toward the said grasping portion of the sleeve to grasp said article therebetween at said spaced areas.

12. The fastener of claim 11 wherein said cam surface is substantially midway between said sides from which said bosses extend and spans more than one-half the thickness of said first part.

13. The fastener of claim 12 wherein said cam surface is curved in transverse cross section.

14. The fastener of claim 12 wherein said first part has a longitudinal axis to which said cam surface is at an angle of about 45°.

15. The fastener of claim 11 wherein said moving means engages said cam surface, the pivoting means thereby comprising said bosses, said pivot follower means and said moving means in addition to said cam surface.

16. The fastener of claim 15 wherein said cam surface is substantially symmetrically located between said sides from which said bosses extend and said end of the cam surface spans more than one-half the thickness of said first part, said cam surface is curved in transverse cross section, and said moving means comprises a screw having an end with a diameter less than the maximum width of said cam surface, said first part having a threaded opening located intermediate said sides from which said pivot bosses extend and engaged by said screw when said first part is in said transverse position.

* * * * *